United States Patent [19]
Grove

[11] Patent Number: 5,085,245
[45] Date of Patent: Feb. 4, 1992

[54] FLOW CONTROL VALVE CARTRIDGE

[75] Inventor: Lee A. Grove, Elkhart, Ind.

[73] Assignee: Remote Controls, Inc., Mishawaka, Ind.

[21] Appl. No.: 621,777

[22] Filed: Dec. 4, 1990

Related U.S. Application Data

[63] Continuation-in-part of Ser. No. 532,064, Jun. 1, 1990, which is a continuation-in-part of Ser. No. 427,255, Oct. 25, 1989, Pat. No. 4,947,886, which is a continuation-in-part of Ser. No. 341,474, Apr. 21, 1989, Pat. No. 4,884,595.

[51] Int. Cl.$^5$ .............. F16K 11/18; F16K 43/00; F16K 55/14
[52] U.S. Cl. ............... 137/454.5; 137/315; 137/636.1; 251/5; 251/263
[58] Field of Search ............. 137/315, 454.2, 454.5, 137/454.6, 636.1; 251/4, 5, 7, 251, 263

[56] References Cited

U.S. PATENT DOCUMENTS

| | | | |
|---|---|---|---|
| Re. 22,429 | 2/1944 | Martin | 137/636.1 |
| 114,981 | 5/1871 | Shoenberger | 251/4 |
| 2,008,961 | 7/1935 | Lessard | 137/72 |
| 2,075,600 | 3/1937 | Baker | 137/636.1 |
| 2,409,765 | 10/1946 | Kehle | 137/636.1 |
| 2,572,658 | 10/1951 | Perkins | 251/4 |
| 2,640,491 | 6/1953 | MacBain | 137/75 |
| 2,701,526 | 2/1955 | Rotkin | 251/5 |
| 2,732,859 | 1/1956 | Chace | 251/122 |
| 2,747,603 | 5/1956 | Klingler | 137/636.1 |
| 2,791,239 | 5/1957 | Mason | 251/9 |
| 2,917,271 | 12/1959 | Banks | 251/122 |
| 2,979,067 | 4/1961 | Kern, Jr. et al. | 137/315 |
| 3,016,915 | 1/1962 | Moeller, Jr. | 137/636.1 |
| 3,044,433 | 7/1962 | Guta | 137/454.2 |
| 3,049,088 | 8/1962 | Curtis | 114/197 |
| 3,075,551 | 1/1963 | Smith et al. | 251/7 |
| 3,108,434 | 10/1963 | Morley et al. | 137/72 |
| 3,223,116 | 12/1965 | Criddle | 251/5 |
| 3,292,718 | 12/1966 | Stone | 251/5 |
| 3,479,001 | 11/1969 | Dower | 251/4 |
| 3,496,022 | 2/1970 | Lit | 137/72 |
| 3,548,878 | 12/1970 | Brigandi | 137/636.1 |
| 3,556,139 | 1/1971 | Yalovega | 251/61.1 |
| 3,589,404 | 6/1971 | Spencer | 137/454.6 |
| 3,598,145 | 8/1971 | Wolfson | 251/360 |
| 3,952,773 | 4/1976 | Hahn | 251/5 |
| 3,998,241 | 12/1976 | Jones et al. | 137/636.1 |
| 4,050,669 | 9/1977 | Brumm | 251/5 |
| 4,060,351 | 11/1977 | Cloup | 251/332 |
| 4,109,423 | 8/1978 | Perrain | 251/7 |
| 4,143,671 | 3/1979 | Olson | 137/72 |
| 4,270,849 | 6/1981 | Criddle | 137/75 |
| 4,275,754 | 6/1981 | Lyons et al. | 137/75 |
| 4,328,834 | 5/1982 | Oates, Sr. et al. | 137/636.1 |
| 4,533,114 | 8/1985 | Cory et al. | 137/75 |
| 4,619,434 | 10/1986 | Snyder et al. | 137/75 |
| 4,642,833 | 2/1987 | Stoltz et al. | 251/5 |
| 4,683,907 | 8/1987 | Brugnoti | 251/5 |

FOREIGN PATENT DOCUMENTS

| | | | |
|---|---|---|---|
| 538359 | 8/1951 | Canada | 137/636.1 |
| 1257738 | 2/1961 | France | 137/636.1 |
| 1327533 | 12/1968 | France . | |

Primary Examiner—George L. Walton
Attorney, Agent, or Firm—Barnes & Thornburg

[57] ABSTRACT

A flow control device has a body having a fluid holding chamber and an inlet port and two outlet ports which are adapted to removably receive valve cartridges. Each valve cartridge has a body having an inlet, an outlet and a fluid flow passageway extending therebetween. A collapsible tubing is mounted in the fluid flow passageway of the valve cartridge body. A piston movably mounted in the fluid flow passageway in the valve cartridge's body is moved into and withdrawn from the inlet of the collapsible tubing to selectively block and unblock the inlet of the collapsible tubing. The blocking of the inlet of the collapsible tubing causes a pressure decrease in the collapsible tubing downstream of the inlet which causes fluid pressure in the fluid flow passageway surrounding the collapsible tubing to collapse a portion of the collapsible tubing around the piston to further block fluid flow through the collapsible tubing. Valve cartridges are selectively provided in the inlet and output ports of the body of the flow control device to configure the flow control device for particular applications.

15 Claims, 1 Drawing Sheet

FLOW CONTROL VALVE CARTRIDGE

This is a continuation-in-part of U.S. Ser. No. 532,064 for a Flow Control Device filed June 1, 1990, which is a continuation-in-part of Ser. No. 427,255 filed 10/25/89 now U.S. Pat. No. 4,947,886 for a Flow Control Device issued Aug. 14, 1990, which is a continuation-in-part of Ser. No. 341,474 filed 4/21/89 U.S. Pat. No. 4,884,595 for a Flow Control Device issued Dec. 5, 1989.

BACKGROUND AND SUMMARY OF THE INVENTION

The present invention relates generally to flow control devices, and more particularly to an improvement of the flow control devices of the above-identified application and patents, the disclosures of which are herein incorporated by reference. Referring as an example to the flow control device which is the subject of U.S. Pat. No. 4,884,595, the flow control device disclosed therein comprises a valve body wherein the valve mechanism is disposed within the valve body. The valve closure mechanism utilizes collapsible tubing wherein, when the collapsible tubing is pinched shut, pressure surrounding it collapses the collapsible tubing to block fluid flow through the flow control device.

A problem with the above-described flow control device arises after the flow control device has been in use for a period of time. After a period of use, the collapsible tubings through wear or the like lose their ability to effectively collapse and block fluid flow through the flow control device. At that point in time, the collapsible tubings must be replaced. However, the flow control devices of the above application and patents require that the entire device be disassembled to be able to replace the collapsible tubings. This typically requires removing the flow control device from the pipeline to which it is attached.

Another problem with the flow control device described in the above application and patents is that the configuration of the flow control device cannot be easily changed. That is, if the flow control device is configured as a two-way valve, it is difficult to change it to a three-way valve. The converse is also true. As a result, an inventory of flow control devices in each configuration must be maintained.

It is an object of this invention to provide a flow control device which makes use of the collapsible tubing principle of the above application and patents that can be easily changed from one configuration to another.

It is another object of this invention to provide a flow control device where the valve mechanism is provided in cartridges which can be removably inserted in inlet and outlet ports of the flow control device and wherein the cartridges have collapsible tubings and use the principles described in the above application and patents to block fluid flow through the flow control device.

It is another object of this invention to provide a valve cartridge for a flow control device where the valve cartridge has therein collapsible tubing which acts in accordance with the principles of the above application and patents and wherein the valve cartridge can be replaced when the valve mechanism becomes worn or the like. Further, the valve cartridge is removably inserted into inlet and outlet ports of the flow control device to configure the flow control device.

SUMMARY OF THE INVENTION

A flow control device according to this invention has a body having a fluid holding chamber therein. The body illustratively has one inlet port and two outlet ports which are adapted to removably receive valve cartridges. Each valve cartridge has a body having an inlet, an outlet, and a fluid flow passageway extending therebetween. A collapsible tubing is mounted in the fluid flow passageway and has an inlet opening to the inlet of the valve cartridge's body and an outlet opening to the outlet of the valve cartridge's body. Means, illustratively a piston mounted in the fluid flow passageway in the valve cartridge's body, is provided for selectively blocking and unblocking the inlet of the collapsible tubing to selectively block and unblock fluid flow therethrough. The blocking of the inlet of the collapsible tubing causes a pressure decrease in the collapsible tubing downstream of the inlet of the collapsible tubing which causes fluid pressure in the fluid flow passageway surrounding the collapsible tubing to collapse a portion of the collapsible tubing downstream of the collapsible tubing's inlet to further block fluid flow through the collapsible tubing. The blocking and unblocking of fluid flow through the collapsible tubing blocks and unblocks fluid flow through the valve cartridge.

The valve cartridges are selectively removably received in the inlet and outlet ports to configure the flow control device for the desired flow control configuration. The blocking and unblocking of fluid flow through the valve cartridges selectively blocks and unblocks fluid flow from the inlet port of the flow control device's body to each of the outlet ports of the flow control device's body according to the desired flow control configuration.

DETAILED DESCRIPTION OF THE DRAWINGS

Figure 1:
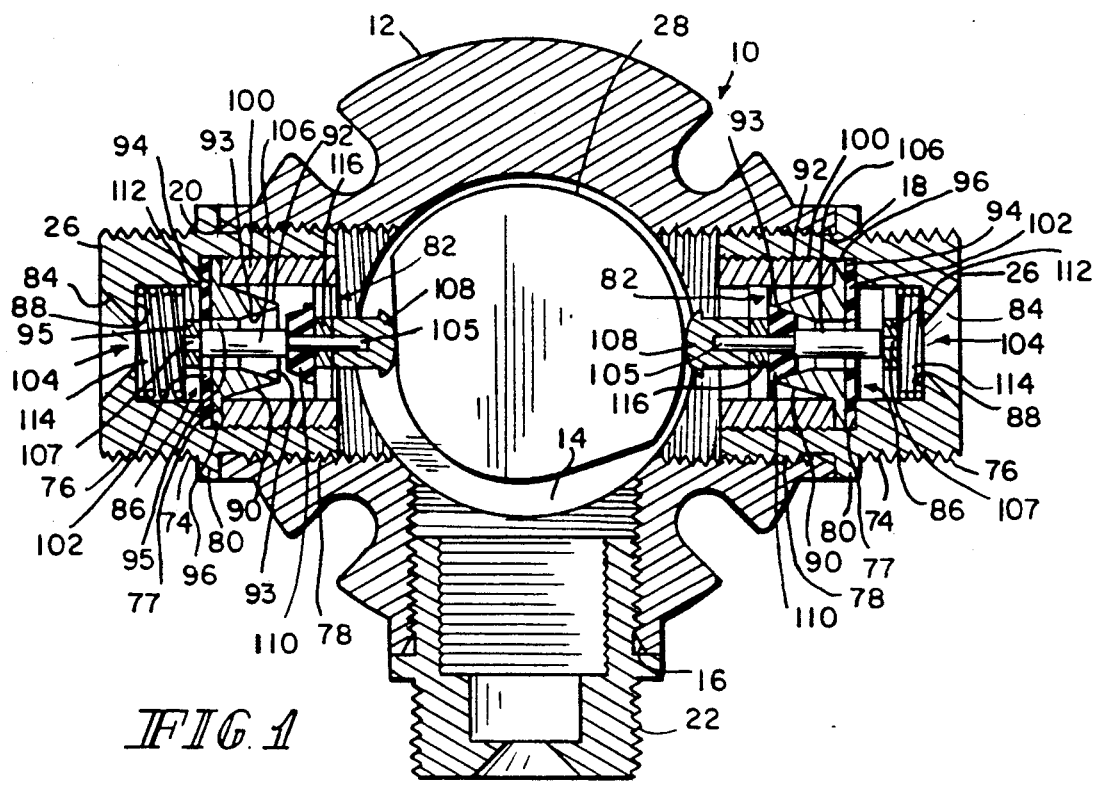
FIG. 1 is a cut-away perspective view of a flow control device according to this invention configured as a three-way valve and shown in the open position.
Figure 2:
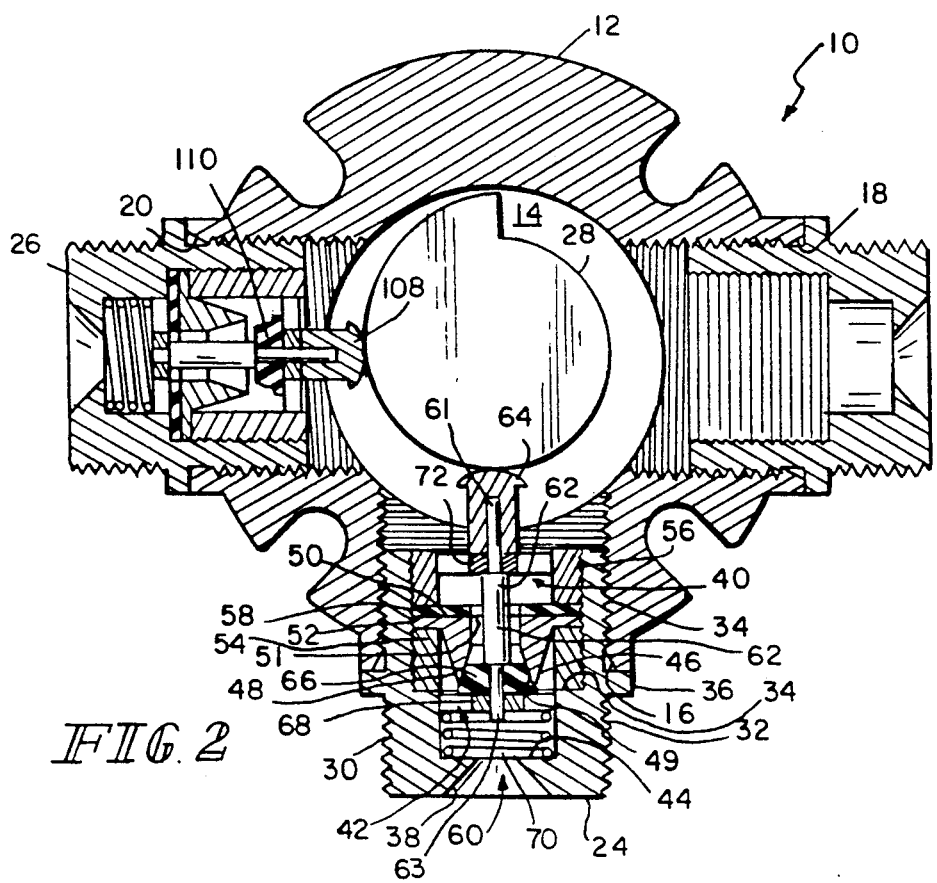
FIG. 2 is a cut-away perspective view of a flow control device constructed in accordance with this invention configured as a two-way valve and shown in the open position.

Referring to the drawings, FIG. 1 shows a flow control device 10 constructed in accordance with this invention which is configured as a three-way valve and which is shown in the open position. FIG. 2 shows flow control device 10 configured as a two-way valve and which is shown in the open position. As will become apparent from the discussion herein, flow control device 10 is configured to be the desired type of valve, i.e., two-way or three-way, by the insertion of normally open or normally closed valve cartridges into the inlet port and/or outlet ports of flow control device 10.

Flow control device 10 has a body 12 having a fluid holding chamber 14 therein. Valve body 12 has an inlet port 16 and outlet ports 18, 20. Inlet port 16 illustratively couples the chamber 14 to a source of pressurized fluid (not shown), and outlet ports 18, 20 illustratively couple chamber 14 to a variety of downstream devices, such as sprinkler heads, plumbing fixtures, wash-down hoses, other manually or automatically operated valves, or a drain (not shown).

Inlet port 16 is internally threaded to threadedly receive a coupling 22 as shown in FIG. 1 or a normally closed valve cartridge 24 as shown in FIG. 2. Outlet ports 18, 20 are also internally threaded to receive a normally open valve cartridge 26 as shown for outlet ports 18, 20 in FIG. 1 and outlet port 20 in FIG. 2, or coupling 22 as shown with respect to outlet port 18 in FIG. 2. Alternatively, valve cartridges 24, 26 can be held in inlet port 16 and outlet ports 18, 20 in other conventional fashions such as by press fitting, clamping or the like.

The flow control device 10 of FIG. 1 is configured as a three-way valve by the insertion of the normally open valve cartridges 26 in outlet ports 18, 20 and the coupling 22 in inlet port 16. The flow control device 10 of FIG. 2 is configured as a two-way valve by the insertion of normally closed valve cartridge 24 in inlet port 16, the coupling 22 in outlet port 18, and the normally open valve cartridge 26 in outlet port 20.

A cam 28 is mounted in chamber 14 of body 12 and actuates the valve cartridges 24, 26 when it is rotated as will be described in more detail later. Cam 28 is illustratively mounted on a shaft (not shown) to which a handle is attached for manual actuation. Moreover, flow control device 10 can be provided with temperature sensitive actuation such as the type described in the previously identified application and patents.

Referring to FIG. 2, normally closed valve cartridge 24 comprises a cylindrical body 30. Cylindrical body 30 has a distal portion 32 and a proximal portion 34 having an annular outwardly extending flange 36 adjacent distal portion 32. Proximal portion 34 of cylindrical body 30 is externally threaded to threadably mate with the internal threads of inlet port 16 when normally closed valve cartridge 24 is inserted into inlet port 16. Normally closed valve cartridge 24 is tightened until the annular outwardly extending flange 36 abuts against the outermost edge of inlet port 16. Distal portion 32 is externally threaded such as with a standard pipe thread for coupling to a pipe or the like.

Cylindrical body 30 of normally closed valve cartridge 24 also has a chamfered inlet 38 in the distal end of distal portion 32, an outlet 40 in the proximal end of proximal portion 34, and a fluid flow passageway 42 extending therethrough which couples inlet 38 to outlet 40. The inside diameter of distal portion 32 of cylindrical body 30 is less than the inside diameter of proximal portion 34 thus forming an annular shoulder 33 in cylindrical body 30 at the junction of distal portion 32 with proximal portion 34 in fluid flow passageway 42. The diameter of the opening of inlet 38 where it opens to fluid flow passageway 42 is smaller than the inside diameter of distal portion 32 of cylindrical body 30 to provide an annular shoulder 44 in cylindrical body 30 at the junction of inlet 38 and fluid flow passageway 42.

A flexible tubing 46 is mounted to cylindrical body 30 of normally closed valve cartridge 24 in fluid flow passageway 42. Flexible tubing 46 is illustratively a truncated cone having a conical section 48 and a base 50. Base 50 includes an outwardly extending annular flange 52. Flexible tubing 46 has an inlet 49 in the apex of conical section 48 which opens to inlet 38 of cylindrical body 30 and an outlet 51 in its base 50 which opens to outlet 40 of cylindrical body 30. Flexible tubing 46 is mounted to cylindrical body 30 of normally closed valve cartridge 24 in fluid flow passageway 42 by having the outwardly extending annular flange 52 of its base 50 sandwiched between cylindrical sleeve 54 and threaded cylindrical sleeve 56 which are inserted in proximal portion 34 of cylindrical body 30. A washer 58 is illustratively provided between base 50 of conical tubing 46 and cylindrical sleeve 56 to support base 50 of flexible tubing 46. A portion of proximal portion 34 of cylindrical body 30 adjacent outlet 40 is internally threaded and threaded cylindrical sleeve 56 is tightened therein to secure flexible tubing 46 in the fluid flow passageway 42 in cylindrical body 30.

Normally closed valve cartridge 24 also includes means 60 for selectively blocking and unblocking flexible tubing 46. Blocking and unblocking means 60 includes a guide pin 62 which extends through fluid flow passageway 46 in cylindrical body 30 having a proximal end 61 and a distal end 63. A cam follower 64 is attached to guide pin 62 at proximal end 61, a chamfered piston 66 is attached to guide pin 62 adjacent distal end 63, and a star washer 68 is affixed to the distal end 63 of guide pin 62. A spring 70 is disposed in flow passageway 42 between star washer 68 and annular shoulder 44 of cylindrical body 30. Cam follower 64 extends into chamber 14 and rides on cam 28. A star washer 72 is affixed to guide pin 62 adjacent cam follower 64 which cooperates with star washer 68 to center guide pin 62 in fluid passageway 42.

Referring to FIG. 1, each normally open valve cartridge 26 has a cylindrical body 74. Cylindrical body 74 has a distal portion 76 and a proximal portion 78 having an annular outwardly extending flange 80 adjacent distal portion 76. Proximal portion 78 is externally threaded to threadably mate with the internal threads of outlet port 18 or 20 and valve cartridge 26 is tightened therein until annular outwardly extending flange 80 is tightened against the outer edge of outlet port 18 or 20.

Cylindrical body 74 of normally open valve cartridge 26 also has an inlet 82 in the proximal end of proximal portion 78, a chamfered outlet 84 in the distal end of distal portion 76, and a fluid flow passageway 86 extending therethrough which couples inlet 82 to outlet 84. The inside diameter of distal portion 76 of cylindrical body 74 is less than the inside diameter of proximal portion 78 thus forming an annular shoulder 77 at the junction of distal portion 76 with proximal portion 78. The diameter of the opening of outlet 84 is smaller than the inside diameter of distal portion 76 of cylindrical body 74 to provide an annular shoulder 88 in cylindrical body 74 at the junction where outlet 84 opens to fluid flow passageway 86.

A flexible tubing 90 is mounted to cylindrical body 74 of normally open valve cartridge 26 in fluid passageway 86. Flexible tubing 90 is illustratively a truncated cone having a conical section 92 and a base 94 and is illustratively identical to flexible tubing 46. Flexible tubing 90 has an inlet 93 in the apex of conical section 92 which opens to inlet 82 of cylindrical body 74 and an outlet 95 in its base 94 which opens to outlet 84 of cylindrical body 74. Base 94 includes an outwardly extending annular flange 96. Flexible tubing 90 is mounted in the fluid passageway 84 of cylindrical body 74 by having the outwardly extending annular flange 96 of its base 94 sandwiched between annular shoulder 77 of cylindrical body 74 and a cylindrical sleeve 100 inserted in the proximal portion 78 cylindrical body 74. A washer 102 is provided between annular shoulder 77 of cylindrical body 74 and the base 94 of flexible tubing 90 to support the base 94 of flexible tubing 90. A portion of proximal 78 of cylindrical body 74 adjacent inlet 82 is internally threaded as is a portion of cylindrical sleeve 100 to permit cylindrical sleeve 100 to be tightened therein to secure flexible tubing 90 in the fluid flow passageway 86 in cylindrical body 74.

Normally closed valve cartridge 26 also includes means 104 for selectively blocking and unblocking flexible tubing 90. Blocking and unblocking means 104 includes a guide pin 106 which extends through fluid flow passageway 86 in cylindrical body 74 having a proximal end 105 and a distal end 107. A cam follower 108 is affixed to the proximal end 105 of guide pin 106. A chamfered piston 110 is affixed to guide pin 106 between cam follower 108 and the inlet 93 of conical section 92 of flexible tubing 90. A star washer 112 is affixed to the distal end 107 of guide pin 106. A spring 114 is disposed in fluid passageway 84 between star washer 112 and annular shoulder 88 of cylindrical body 74. A star washer 116 is affixed to guide pin 106 adjacent cam follower 108. Star washers 116 and 112 center guide pin 106 in fluid passageway 86. Cam follower 108 extends from the proximal end of guide pin 106 into chamber 14 and rides against cam 28.

Referring first to FIG. 1, the operation of flow control device 10 as a three-way valve, as shown in FIG. 1, and the operation of normally open valve cartridge 26 will be described. As mentioned, flow control device 10, configured as a three-way valve, is shown in FIG. 1 in its normally open condition. Cam 28 has been rotated so that the normally open valve cartridge 26 received in outlet port 18 is closed and the normally open valve cartridge 26 received in outlet port 20 is open. Fluid will then flow through inlet port 16, into fluid holding chamber 14 and out through outlet port 20 through normally open valve cartridge 26 in outlet port 20. Normally open valve cartridge 26 in outlet port 18, being closed, will prevent fluid from flowing out from fluid holding chamber 14 through outlet port 18.

When normally open valve cartridge 26 is closed, as shown by the normally open valve cartridge 26 in outlet port 18 in FIG. 1, cam follower 108 has been forced by cam 28 toward the outlet 84 in cylindrical body 74 of normally open valve cartridge 26. This moves guide pin 106 outwardly toward outlet 84 forcing chamfered piston 110 into the inlet 93 of flexible tubing 90. Illustratively, the inlet 93 of flexible tubing 90 is chamfered to conform to chamfered piston 110. The movement of guide pin 106 outwardly causes star washer 112 on the distal end 107 of guide pin 106 to compress spring 114. When chamfered piston 110 is forced into the inlet 93 of flexible tubing 90, it blocks fluid flow through flexible tubing 90. Since fluid holding chamber 14 is coupled to a source of pressurized fluid by inlet port 16, forcing chamfered piston 110 into the inlet 93 of collapsible tubing 90 will cause a decrease in pressure in the collapsible tubing 90 downstream of its inlet 93. Consequently, the pressure in the fluid flow passageway 86 surrounding the conical section 92 of collapsible tubing 90 will be greater than the pressure inside conical section 92 of collapsible tubing 90 downstream of its inlet 93. This collapses conical section 92 of collapsible tubing 90 around chamfered piston 110 to further block fluid flow through collapsible tubing 90. The blocking of fluid flow through collapsible tubing 90 blocks fluid flow through normally open valve cartridge 26.

Normally open valve cartridge 26 in outlet port 20 of the fluid flow control device 10 shown in FIG. 1 is shown in its normally open position. Cam 28 has been rotated to permit spring 114, acting against star washer 112, to force guide pin 106 toward the inlet 82 of cylindrical body 74 of normally open valve cartridge 26. This forces chamfered piston 110 out of the inlet 93 of flexible tubing 90, thus unblocking fluid flow through collapsible tubing 90 which unblocks fluid flow through normally open valve cartridge 26.

Cam 28 is cut to operate the flow control device 10 of FIG. 1 as a three-way valve. As shown in FIG. 1, the flow control device 10 has its outlet port 20 open or unblocked to fluid holding chamber 14, and thus to its inlet port 16. Its outlet port 18 is closed or blocked to fluid holding chamber 14 and thus to its inlet port 16. When cam 28 is rotated, the normally open valve cartridge 26 in outlet port 20 is closed, blocking fluid flow from fluid holding chamber 14 through outlet port 20 and thus blocking outlet port 20 from inlet port 16. The normally open valve cartridge 26 in outlet port 18 is opened, unblocking fluid flow from chamber 14 through outlet port 18 and thus unblocking outlet port 18 from inlet port 16.

Referring to FIG. 2, the operation of the flow control device 10 configured as a two-way valve is described as is the operation of normally closed valve cartridge 24 in inlet port 16. As shown in FIG. 2, normally closed valve cartridge 24 is in its normally closed position and normally open valve cartridge 26 in outlet port 20 is in its normally open position. Fluid flow is thus blocked from inlet port 16 into fluid holding chamber 14. Fluid flow is unblocked from fluid holding chamber 14 to outlet port 20. Since outlet 18 only has coupling 22 therein, fluid flow from fluid holding chamber 14 to outlet port 18 will be unblocked at all times.

As shown in FIG. 2, cam 28 has been rotated to allow spring 70, acting against star washer 68, to urge guide pin 62 of normally closed valve cartridge 24 toward chamber 14 thus forcing chamfered piston 66 into the inlet 49 of flexible tubing 46. The inlet 49 of flexible tubing 46 is illustratively chamfered to conform to chamfered piston 66. When chamfered piston 66 is forced into the inlet 49 of flexible tubing 46, it blocks fluid flow therethrough. Since inlet port 16 is coupled to a source of pressurized fluid, forcing chamfered piston 66 into inlet 49 of collapsible tubing 46 will cause a pressure decrease in collapsible tubing 46 downstream of its inlet 49. Consequently, the pressure in the fluid passageway 42 surrounding the conical section 48 of collapsible tubing 46 will be greater than the pressure inside conical section 48 downstream of its inlet 49. This collapses conical section 48 of collapsible tubing 46 around chamfered piston 66 to further block fluid flow through collapsible tubing 46. The blocking of fluid flow through collapsible tubing 46 blocks fluid flow through normally closed valve cartridge 24.

When cam 28 is rotated, it closes normally open valve cartridge 26 in outlet port 20 by forcing cam follower 108 outwardly thus forcing chamfered piston 110 into the inlet 93 of collapsible tubing 90. It also opens normally closed valve cartridge 24 in inlet port 16 by forcing cam follower 64 outwardly. When cam follower 64 is forced outwardly, chamfered piston 66 is also forced outwardly and is withdrawn from the inlet 49 of flexible tubing 46, thus opening normally closed valve cartridge 24. Fluid flow from fluid holding chamber 14 to outlet port 20 is thus blocked and fluid flow from inlet port 16 to fluid holding chamber 14 is unblocked. Outlet port 18 is thus unblocked from inlet port 16.

Although the invention has been described in detail with reference to certain preferred embodiments and specific examples, variations and modifications exist within the scope and spirit of the invention as described and as defined in the following claims.

What is claimed is:

1. A flow control device, comprising a body having a fluid-holding chamber therein;

the body having an inlet port opening into the chamber for coupling the chamber to a supply of a fluid flow under a positive pressure and an outlet port opening into the chamber; and a valve cartridge removably received in at least one of the inlet and outlet ports of the body of the flow control device;

said valve cartridge comprising a body having an inlet, an outlet, and a fluid flow passageway extending therebetween, a collapsible tubing mounted in the fluid flow passageway, the collapsible tubing having an inlet opening to the inlet of the valve cartridge's body and an outlet opening to the outlet of the valve cartridge's body, and means secured in the fluid flow passageway for selectively blocking and unblocking the inlet of the collapsible tubing to block and unblock fluid flow therethrough, and actuating means, disposed in the fluid-holding chamber, for actuating said selectively blocking and unblocking means, wherein blocking the inlet of the collapsible tubing with said selectively blocking and unblocking means causes a decrease in pressure in the collapsible tubing downstream of its inlet which causes fluid pressure in the fluid flow passageway surrounding the collapsible tubing to collapse a portion of the collapsible tubing around said selectively blocking and unblocking means downstream of the collapsible tubing's inlet to further block fluid flow through the collapsible tubing and the valve cartridge.

2. A flow control device, comprising a body having a fluid-holding chamber therein;

the body having an inlet port opening into the chamber for coupling the chamber to a supply of a fluid flow under a positive pressure and an outlet port opening into the chamber; and a plurality of valve cartridges selectively removably received in the inlet and outlet ports to configure the flow control device for a particular flow control application;

each of said valve cartridges comprising a body having an inlet, an outlet, and a fluid flow passageway extending therebetween, a collapsible tubing mounted in the fluid flow passageway, the collapsible tubing having an inlet opening to the inlet of the valve cartridge's body and an outlet opening to the outlet of the valve cartridge's body flow, and means secured in the fluid flow passageway for selectively blocking and unblocking the inlet of the collapsible tubing to block and unblock fluid flow therethrough and actuating means, disposed in the fluid-holding chamber, for actuating said selectively blocking and unblocking means, wherein blocking the inlet of the collapsible tubing with said selectively blocking and unblocking means causes a decrease in pressure in the collapsible tubing downstream of its inlet which causes fluid pressure in the fluid flow passageway surrounding the collapsible tubing to collapse a portion of the collapsible tubing around said selectively blocking and unblocking means downstream of the collapsible tubing's inlet to further block fluid flow through the collapsible tubing and the valve cartridge.

3. The flow control device of claim 2 wherein the blocking and unblocking means of the valve cartridges includes each valve cartridge having a piston movably mounted in the fluid flow passageway of the valve cartridge's body and means for inserting the piston into and withdrawing it from the inlet of the collapsible tubing to block and unblock fluid flow through the collapsible tubing, wherein the portion of the collapsible tubing which collapses does so around the piston when the piston is inserted into the inlet of the collapsible tubing.

4. The flow control device of claim 3 wherein the means for inserting the piston into and withdrawing it from the inlet of the collapsible tubing comprises a cam follower to which the piston is coupled which follows a cam in the fluid holding chamber to move the piston outwardly from the fluid holding chamber and a spring coupled between the piston and the body of the valve cartridge for urging the piston inwardly toward the fluid holding chamber.

5. The flow control device of claim 2 wherein the valve cartridge for insertion into the inlet port comprises a normally closed valve cartridge and the valve cartridges for insertion into the outlet ports comprise normally open valve cartridges.

6. The flow control device of claim 5 wherein the normally closed valve cartridge has as its means for blocking and unblocking fluid flow through its collapsible tubing a piston movably mounted in the fluid flow passageway between the inlet of the collapsible tubing and the inlet of the valve cartridge's body, a spring coupled between the piston and the valve cartridge's body for urging the piston into the inlet of the collapsible tubing, and a cam follower coupled to the piston which follows a cam in the fluid holding chamber to urge the piston out from the inlet of the collapsible tubing, the outlet of the valve cartridge's body opening to the fluid holding chamber when the valve cartridge is removably received in the inlet port of the body of the flow control device.

7. The flow control device of claim 5 wherein the normally open valve cartridge has as its means for blocking and unblocking fluid flow through its collapsible tubing a piston movably mounted in the fluid flow passageway of the valve cartridge's body between the inlet of the fluid flow passageway in the valve cartridge's body and the inlet of the collapsible tubing, a spring coupled between the piston and the valve cartridge's body for urging the piston out of the inlet of the collapsible tubing toward the fluid holding chamber, and a cam follower coupled to the piston for following a cam in the fluid holding chamber for urging the piston away from the fluid holding chamber into the inlet of the collapsible tubing, the inlet of the valve cartridge's body opening to the fluid holding chamber when the valve cartridge is removably received in one of the outlet ports.

8. The flow control device of claim 5 wherein the body of the flow control device has two outlet ports, a normally closed valve cartridge being removably received in the inlet port and a normally open valve cartridge being removably received in one of the outlet ports to configure the flow control device as a two-way valve.

9. The flow control device of claim 5 wherein the body of the flow control device has two outlet ports and a normally open valve cartridge being removably received in each outlet port to configure the flow control device as a three-way valve.

10. A valve cartridge for a flow control device, comprising a body having an inlet, an outlet, and a fluid flow passageway extending therebetween, a collapsible tubing mounted to the body in the fluid flow passageway and having an inlet opening to the inlet of the valve cartridge's body and an outlet opening to the outlet of the valve cartridge's body, means secured in the fluid flow passageway for blocking the inlet of the collapsible tubing and for causing a decrease in fluid pressure within the collapsible tubing downstream of its inlet such that a portion of the collapsible tubing downstream of its inlet collapses around the blocking means to further block fluid flow through the collapsible tubing and the valve cartridge, and the body of the valve cartridge adapted to be removably received in a port of a flow control device.

11. The valve cartridge of claim 10 wherein the body of the valve cartridge has a threaded portion to adapt it to be removably received in a threaded port of a flow control device.

12. The valve cartridge of claim 10 wherein said blocking means comprises a piston movably mounted in the fluid flow passageway between the inlet of the valve cartridge's body and the inlet of the collapsible tubing, a cam follower coupled to the piston, and a spring coupled between the piston and the valve cartridge's body wherein the cam follower and spring cooperate to urge the piston into and out of the inlet of the collapsible tubing.

13. The valve cartridge of claim 12, further including a guide pin extending through the fluid flow passageway and the collapsible tubing wherein the piston and cam follower are attached to the guide pin and the spring acts against it between the guide pin and the body of the valve cartridge.

14. The valve cartridge of claim 13 wherein the valve cartridge is a normally closed valve cartridge, the cam follower is attached to a proximal end of the guide pin which extends through the outlet of the valve cartridge's body, the spring is disposed in the fluid flow passageway between a distal end of the guide pin and the inlet of the valve cartridge's body, and the piston is attached to the guide pin between the distal end of the guide pin and the inlet of the collapsible tubing through which the guide pin extends.

15. The valve cartridge of claim 13 wherein the valve cartridge is a normally open valve cartridge, the cam follower is attached to a proximal end of the guide pin which extends through the outlet of the valve cartridge's body, the spring is disposed in the fluid flow passageway between a distal end of the guide pin and the inlet of the valve cartridge's body, and the piston is attached to the guide pin between the proximal end of the guide pin and the outlet of the collapsible tubing through which the guide pin extends.

* * * * *